United States Patent

Sasaki et al.

[11] Patent Number: 5,815,112
[45] Date of Patent: Sep. 29, 1998

[54] PLANAR ARRAY ANTENNA AND PHASE-COMPARISON MONOPULSE RADAR SYSTEM

[75] Inventors: Kunihiko Sasaki, Kuwana; Masanobu Yukumatsu, Kariya; Toshiya Saito, Hekinan; Hideo Matsuki, Kariya; Hiroshi Hazumi, Nagoya, all of Japan

[73] Assignee: Denso Corporation, Kariya, Japan

[21] Appl. No.: 759,528

[22] Filed: Dec. 5, 1996

[30] Foreign Application Priority Data

Dec. 5, 1995 [JP] Japan .................................. 7-316736

[51] Int. Cl.$^6$ .............................. G01S 13/44; G01S 13/93
[52] U.S. Cl. .......................... 342/70; 342/113; 342/153; 342/175; 343/700 MS
[58] Field of Search ............................ 342/69, 70, 71, 342/72, 80, 113, 115, 149, 153, 154, 155, 156, 157, 158, 175; 343/700 MS

[56] References Cited

U.S. PATENT DOCUMENTS

| 3,803,624 | 4/1974 | Kinsey | 342/380 |
|---|---|---|---|
| 3,987,451 | 10/1976 | Peterson | 343/771 X |
| 4,120,085 | 10/1978 | Oeterson | 343/771 X |
| 4,408,205 | 10/1983 | Hockman | 342/157 |
| 4,423,392 | 12/1983 | Wolfson | 343/700 MS |
| 4,958,166 | 9/1990 | Branigan et al. | 343/771 |
| 5,394,163 | 2/1995 | Bullen et al. | 343/700 MS |
| 5,483,248 | 1/1996 | Milroy | 343/785 |

Primary Examiner—John B. Sotomayor
Attorney, Agent, or Firm—Cushman, Darby & Cushman IP Group of Pillsbury, Madison & Sutro LLP

[57] ABSTRACT

A planar array antenna comprises a plurality of antenna elements disposed in a predetermined matrix pattern. Feeders extend from a feed to the antenna elements. High-frequency switches cooperatively open or close the feeders connected to antenna elements of at least one row of the matrix pattern located at both a right-end and a left-end regions of an antenna surface. Switching signals are supplied to the high-frequency switches from switching terminals for alternately activating the associated antenna elements, thereby providing two time-divisional array antennas offset in position by a distance corresponding to the width of at least one row of the antenna elements controlled.

9 Claims, 9 Drawing Sheets

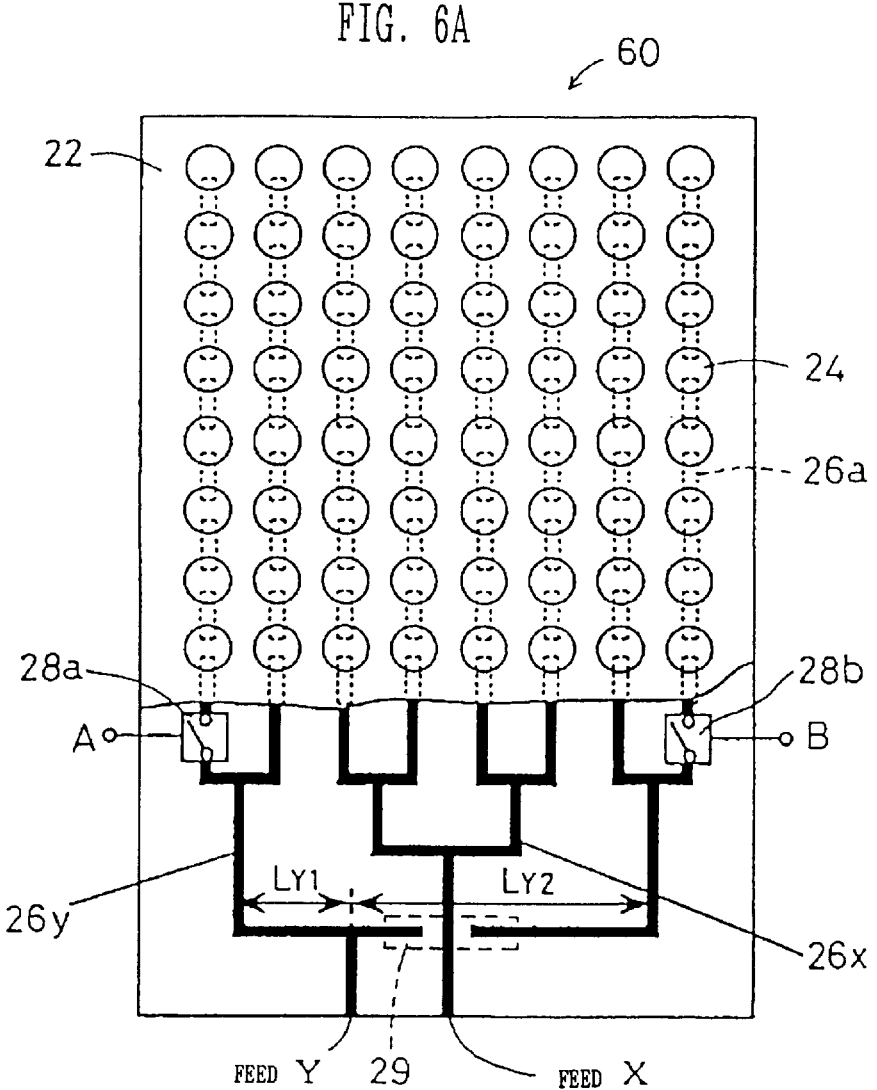
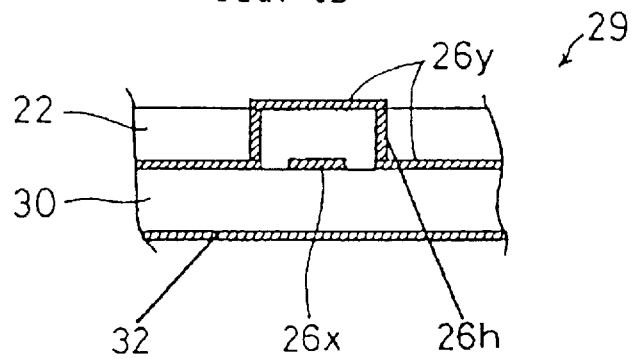

PLANAR ARRAY ANTENNA AND PHASE-COMPARISON MONOPULSE RADAR SYSTEM

BACKGROUND OF THE INVENTION

1. Field of the Invention

This invention relates to a planar array antenna preferably used in a phase-comparison monopulse radar system and a phase-comparison monopulse radar system using this planar array antenna.

2. Related Art

To prevent collisions of mobile bodies, such as automotive vehicles, realization of radar systems capable of detecting obstacles by using radio waves is earnestly expected. In this kind of radar systems, detecting a horizontal distance of an obstacle existing or moving in the forward direction of the radar system is very important. In this respect, a monopulse radar system has the capability of effectively working as an obstacle detecting radar system for automotive vehicles.

In general, the phase-comparison monopulse radar system transmits a predetermined radio wave outward through a transmitting antenna and, when the transmission radio wave is reflected by a target (obstacle), a pair of receiving antennas offset in position and having different beam directions receives the reflected radio wave. The position (and/or direction etc.) of the target is measured or calculated based on the phase (or amplitude) difference between the receiving signals obtained from the pair of receiving antennas. The monopulse radar systems are widely used and famous as aircraft tracking radars. However, the monopulse radar system has the capability of effectively acting as a land vehicle radar by disposing the pair of receiving antennas in an offset relationship along a horizontal direction so as to have different path lengths and beam directions with respect to the target.

The monopulse radar systems are roughly classified into the phase-comparison monopulse radar systems and the amplitude-comparison monopulse radar systems. As shown in FIG. 9, the phase-comparison monopulse radar system detects the direction $\theta$ of a target Px based on the phase difference $\phi$ between two receiving signals obtained from a pair of receiving antennas A1 and A2 offset in position with a distance D. More specifically, the phase difference $\phi$ depends on the difference of path lengths $L_{A1}$ and $L_{A2}$. Path length $L_{A1}$ is the distance between target Px and a receiving point P1 of antenna A1, while path length $L_{A2}$ is the distance between target Px and a receiving point P2 of antenna A2. When $\lambda$ represents the wavelength of radio wave, the direction $\theta$ of the target Px is defined by the following equation (1).

$$\theta = (2\pi/\lambda) \cdot D \cdot \sin\theta \tag{1}$$

Accordingly, when the phase-comparison monopulse radar is arranged, it is basically necessary to receive reflection radio wave simultaneously by a pair of antennas A1 and A2 having the same directivity.

On the other hand, the amplitude-comparison monopulse radar systems detect the direction of the target based on the amplitude difference between the receiving signals obtained from the pair of receiving antennas different in the direction of radiated beams.

According to the conventional monopulse radar systems, they are normally equipped with waveguide horns or parabola antennas serving as receiving antennas. The waveguide horns or parabola antennas are generally large in size and unsuitable for mass production, since they have been chiefly developed for the aircraft tracking system. Thus, without reduction of size and improvement for the mass production, the monopulse radar systems cannot be used as land vehicle radars.

Especially, as explained above with reference to FIG. 9, the phase-comparison monopulse radar system definitely requires a pair of antennas receiving the radio wave reflected from the target. Provision of two independent antennas will enlarge the overall size of the radar system. When the interval D of two antennas A1 and A2 is excessively large (refer to FIG. 10A), there is the possibility that the phase difference $\phi$ between the receiving signals is largely changed in response to a small change of the direction $\theta$ of the target Px. The phase difference $\phi$ may exceed 360° (corresponding to the range of $\pm\pi$ in FIG. 10A). If the phase difference $\phi$ exceeds 360°, a plurality of positions will be identified as corresponding to this phase difference, as apparent from the comparison between FIG. 10A and 10B. It is hence impossible to identify only one (true) direction of the target univocally.

To avoid the above-described problem, antenna apertures and antenna gains need to be reduced to realize a smaller antenna interval. However, using such antennas having smaller antenna apertures and antenna gains will result in a fatal reduction of the maximum range (or distance) of the radar system.

SUMMARY OF THE INVENTION

Accordingly, in view of above-described problems encountered in the related art, a principal object of the present invention is to provide a planar array antenna and a phase-comparison monopulse radar system using this planar array antenna which are compact in size and suitable for mass production and preferably installed on a mobile body, such as an automotive vehicle, as a radar.

In order to accomplish this and other related objects, the present invention provides a novel and excellent planar array antenna and a phase-comparison monopulse radar system using this planar array antenna having various aspects which will be described hereinafter together with reference numerals in parentheses which show the correspondence to the components of the preferred embodiments of the present invention described later.

Reference numerals in parentheses, added in the following description, are merely used for the purpose of helping the understanding to the present invention and not used for narrowly interpreting the scope of claims of the present invention.

A first aspect of the present invention provides a planar array antenna comprising a plurality of antenna elements (24; 44) disposed in a predetermined matrix pattern, feeder means comprising feeders (26a, 26b; 46; 26x, 26y; 46x, 46y) for supplying electric power to the antenna elements, switching means (28a, 28b; 48a, 48b) for opening or closing feeders of the feeder means connected to antenna elements constituting at least one row located at both a right end region and a left end region of the matrix pattern; and switching terminal means (A, B) for supplying switching signals to the switching means for alternately activating the antenna elements disposed along the rows in the right end region and the left end region of the matrix pattern, thereby providing two array antennas which are offset in position by a distance corresponding to a width of the at least one row of the antenna elements controlled by the switching means and activated in a time-divisional fashion.

According to the features of preferred embodiments of the present invention, each of the antenna elements (24; 44) is formed by a plane patch. The feeder means comprises serial feeders (26a; 46a) disposed along each row of the matrix pattern for supplying electric power to the plurality of antenna elements, and parallel feeders (26b; 46b: 26x, 26y) supplying electric power to the serial feeders. Alternatively, the feeder means comprises parallel feeders (46; 46x, 46y) directly supplying electric power to all of the plurality of antenna elements. Furthermore, the feeder means comprises a first feeder comprising the feeders opened or closed by the switching means and supplying electric power to antenna elements disposed along rows in the right end and left end regions of the matrix pattern, and a second feeder supplying electric power to antenna elements disposed along rows in the central region of the matrix pattern.

A second aspect of the present invention provides a phase-comparison monopulse radar system incorporating the above-described first aspect planar array antenna (10; 40) as a receiving antenna exclusively used for receiving radio waves. In the phase-comparison monopulse radar system according to the second aspect of the present invention, switching signal generating means (20, 20a) generates the switching signals. Transmission signal generating means (20, 2) generates a transmission signal and transmits a transmission radio wave through a transmitting antenna (6). Distribution means (14) receives reflection radio wave through the planar array antenna when the transmission radio wave is reflected from a target, and distributes a receiving signal obtained from the planar array antenna into two kinds of receiving signals in response to each switching signal produced from the switching signal generating means. And, target detecting means (12, 16a, 16b, 20) detects a direction of the target based on a phase difference between the two kinds of receiving signals distributed by the distribution means.

A third aspect of the present invention provides a phase-comparison monopulse radar system incorporating the above-described first aspect planar array antenna (60; 70) as a transmitting/receiving antenna used for both transmitting and receiving radio waves. In the planar array antenna (60; 70), the feeder means comprises a first feeder (26y; 46y) comprising the feeders opened or closed by the switching means and supplying electric power to antenna elements disposed along rows in the right end and left end regions of the matrix pattern, and a second feeder (26x; 46x) supplying electric power to antenna elements disposed along rows in the central region of the matrix pattern.

In the phase-comparison monopulse radar system according to the third aspect of the present invention, switching signal generating means (20, 20a) generates the switching signals. A circulator (62) is connected to a feed (terminal) of the second feeder of the planar array antenna. Transmission signal generating means (20, 2) generates a transmission signal, sends the transmission signal to the feed of the second feeder through the circulator, and transmits a transmission radio wave from antenna elements disposed along the rows in the central region of the matrix pattern. Combining means (64) receives reflection radio wave through the planar array antenna when the transmission radio wave is reflected from a target, receives a first receiving signal obtained from the feed of the second feeder through the circulator, and combines the first receiving signal with a second receiving signal obtained from a feed of the first feeder. Distribution means (14) receives a combined receiving signal produced from the combining means into two kinds of receiving signals in response to each switching signal produced from the switching signal generating means. And, target detecting means (20) detects a direction of the target based on a phase difference between the two kinds of receiving signals distributed by the distribution means.

It is preferable in the above-described second and third aspects of the present inventions that the transmission signal generating means generates a predetermined continuous radio wave carrying the transmission signal, and the target detecting means detects the receiving signals by homodyne detection and calculates the direction, distance and relative velocity of the target based on the detection signal.

BRIEF DESCRIPTION OF THE DRAWINGS

The above and other objects, features and advantages of the present invention will become more apparent from the following detailed description which is to be read in conjunction with the accompanying drawings, in which:

FIG. 6A is a front view showing an antenna surface of a transmitting/receiving antenna used in an automotive radar system in accordance with a third embodiment of the present invention;

FIG. 6B is a cross-sectional view showing an antenna element section of the transmitting/receiving antenna in accordance with the third embodiment of the present invention;

DETAILED DESCRIPTION OF THE PREFERRED EMBODIMENTS

Figure 1A:
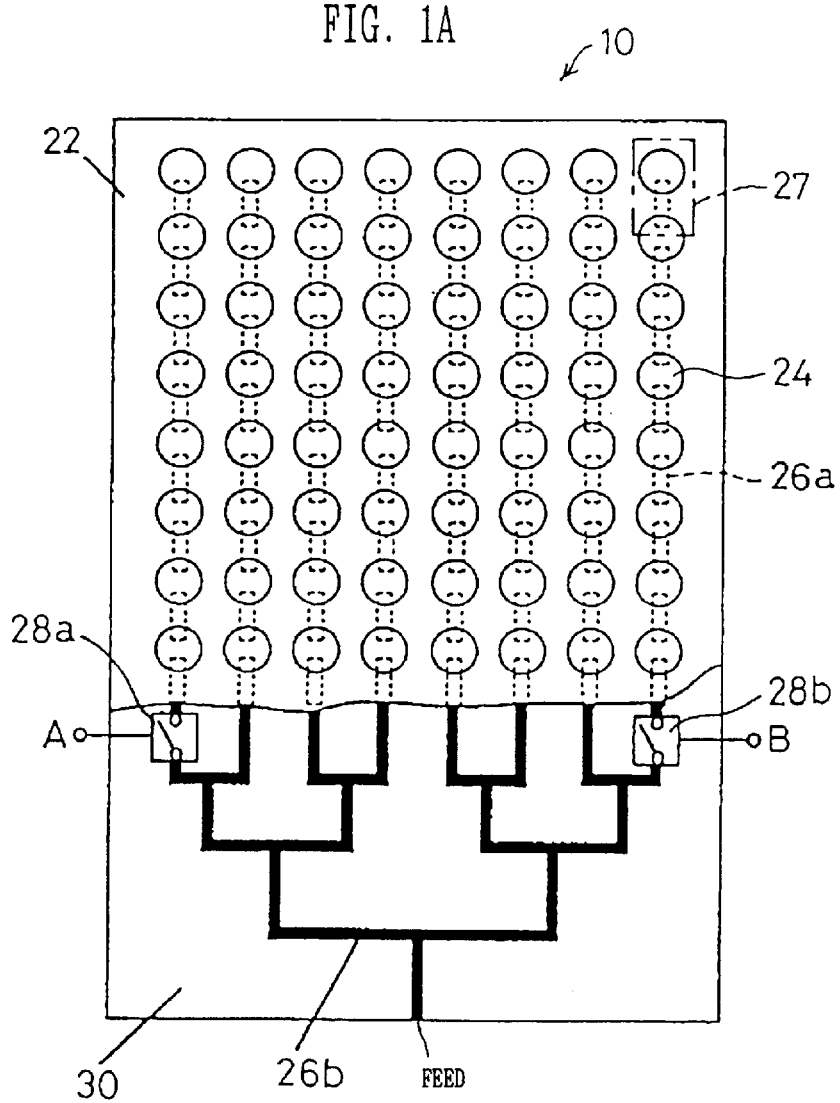
FIG. 1A is a front view showing an antenna surface of a receiving antenna used in an automotive radar system in accordance with a first embodiment of the present invention.

Preferred embodiments of the present invention will be explained in greater detail hereinafter with reference to the accompanying drawings. Identical parts are denoted by the same reference numerals throughout the views.

First Embodiment

Figure 2:
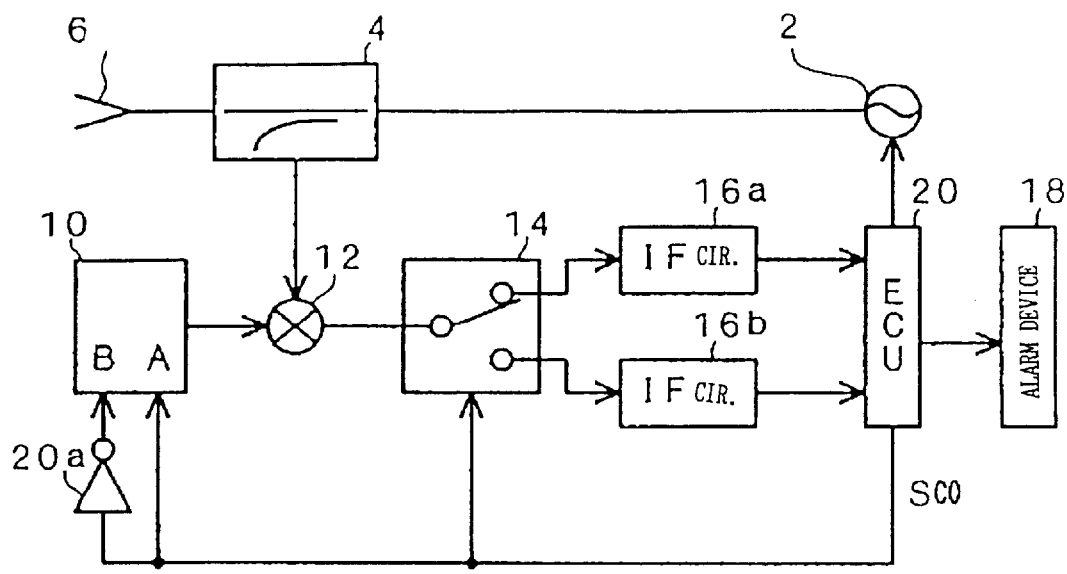
FIG. 2 is a block diagram showing an arrangement of the automotive radar system in accordance with the first embodiment of the present invention.

FIG. 2 is a block diagram showing an arrangement of an automotive radar system in accordance with a first embodiment of the present invention.

The radar system of the first embodiment is installed or mounted on a mobile body, such as an automotive vehicle, to detect a target (i.e. obstacle) existing or moving in the forward direction of the mobile body. If there is any possibility that the mobile body collides with the detected obstacle, a warning will be generated to inform a driver of the coming danger. A receiving antenna 10 is a planar array antenna acting as time-divisional (or time sharing) array antenna capable of forming two offset antennas positioned at different portions of the receiving antenna 10 with a predetermined horizontal interval in a time divisional (or time sharing) manner.

Furthermore, the radar system of the present invention is a phase-comparison monopulse radar system which cyclically and speedily switches the receiving antenna 10 to either one of two offset array antennas, sends out a radio wave from a transmitting antenna 6 to a target (i.e. obstacle) and receives the radio wave reflected from the target by the receiving antenna 10, distributes the received radio wave to two kind of receiving signals corresponding to the two array antennas cyclically and speedily switched or activated, and detects the direction of the target based on the phase difference between the distributed receiving signals.

Furthermore, the radar system of this embodiment functions as an FM-CW (frequency-modulated continuous wave) radar as well as the above-described phase-comparison monopulse radar.

More specifically, as shown in FIG. 2, the radar system of this embodiment comprises an electronic control apparatus (hereinafter, ECU) 20, a voltage-controlled oscillator 2, a directional coupler 4, a mixer circuit 12, a pair of IF (intermediate frequency) circuits 16a and 16b, an analog switch 14, and an alarm device 18. ECU 20 calculates the direction, distance and relative velocity of the target based on the receiving signals obtained from the receiving antenna 10. Voltage-controlled oscillator 2 receives a control voltage (triangular wave) generated from ECU 20 and increases or decreases its oscillation frequency in response to the control voltage.

Directional coupler 4 receives the output signal of the voltage-controlled oscillator 2 and sends it as a transmission signal to a feed (terminal) of the transmitting antenna 6. Transmitting antenna 6 transmits a transmission radio wave whose frequency gradually increases along an ascending slope of the triangular waveform and gradually decreases along a descending slope. Directional coupler 4 distributes the transmission signal according to a predetermined ratio. Mixer circuit 12 has an RF terminal receiving the output (i.e. receiving signal) of receiving antenna 10 and an LO terminal receiving the transmission signal distributed by directional coupler 4. Thus, mixer circuit 12 mixes the receiving signal obtained from receiving antenna 10 with the transmission signal sent from directional coupler 4, and produces an intermediate frequency signal (hereinafter referred to as IF signal) having a frequency equivalent to the difference between frequencies of these mixed signals. In other words, mixer circuit 12 performs the frequency conversion (i.e. homodyne detection).

Each of IF circuits 16a and 16b amplifies or integrates the IF signal produced from mixer circuit 12. Analog switch 14 selectively switches its changeover (movable) terminal between two stationary terminals connected to IF circuits 16a and 16b, respectively, in response to a switching signal SCO generated from ECU 20. When the switching signal SCO is a positive voltage, the IF signal produced from mixer circuit 12 is sent to IF circuit 16a through analog switch 14. When the switching signal SCO is a negative voltage, the IF signal produced from mixer circuit 12 is sent to IF circuit 16b through analog switch 14. Alarm device 18 generates an alarm of danger in response to alarm information generated from ECU 20.

ECU 20, which is constituted chiefly by a micro computer comprising CPU, ROM, RAM, functions as an FM-CW radar and a phase-comparison monopulse radar in accordance with a predetermined program, the procedure of which will be explained later.

The switching signal SCO, generated from ECU 20, alternates a positive voltage and a negative voltage at a predetermined period of time to switch the receiving antenna 10 between the two array antennas disposed at different portions thereof. The switching signal SCO is supplied to a switching terminal A of receiving antenna 10 directly and also supplied to a switching terminal B of receiving antenna 10 as an inverted signal via an inverter 20a.

Figure 1B:
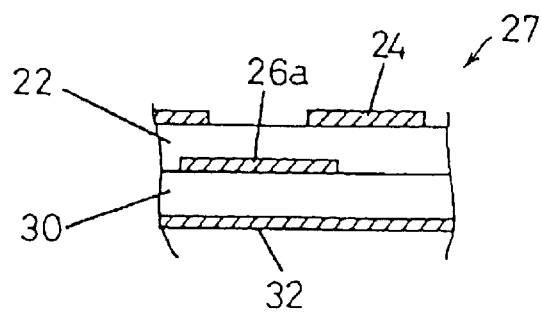
FIG. 1B is a cross-sectional view showing an antenna element section of the receiving antenna in accordance with the first embodiment of the present invention.

Next, an arrangement of receiving antenna 10 serving as an essential component of the present invention will be explained with reference to FIGS. 1A and 1B. FIG. 1A shows a front surface of receiving antenna 10 emitting radio wave therefrom. FIG. 1B is a cross-sectional view showing an antenna element region 27 shown in FIG. 1A. FIG. 1A is a partly broken view showing the details of the internal feeder arrangement of the receiving antenna 10.

As shown in FIGS. 1A and 1B, receiving antenna 10 comprises a first dielectric substrate 22 disposed at the front side thereof for emitting the radio wave and a second dielectric substrate 30 disposed at the reverse side thereof. A plurality of antenna elements 24 are disposed on the front surface of first dielectric substrate 22 in a predetermined matrix pattern. For example, eight antenna element 24 are arrayed along the vertical direction (i.e. in the direction of row) and eight antenna element 24 are arrayed along the horizontal direction (i.e. in the direction of line), thereby constituting a matrix pattern of 8 lines×8 rows.

Each antenna element 24 is constituted by a disk-shaped plane patch. These antenna elements 24 are equally spaced in both line and row directions. The interval of adjacent antenna elements 24 is determined in accordance with the frequency of the receiving signal to obtain optimum receiving characteristics.

Serial feeders 26a and parallel feeder 26b are provided on the reverse surface of first dielectric substrate 22. Each serial feeder 26a connects adjacent antenna elements 24 arrayed along each row to realize an electric power feeding based on the electromagnetic coupling method. The parallel feeder 26b, which extends from the bottom to the top and branches hierarchically and symmetrically into eight branched feeders, performs the in-phase parallel current feeding for respective eight rows of antenna elements 24.

A high-frequency switch 28a is provided on the leftmost branched parallel pathway connected to the serial feeder 26a of the leftmost row of antenna elements 24. A high-frequency switch 28b is provided on the rightmost branched parallel pathway connected to the serial feeder 26a of the rightmost row of antenna elements 24.

The second dielectric substrate 30 is accumulated or stacked on the reverse side of first dielectric substrate 22, with the above-described feeders 26a, 26b and high-frequency switches 28a, 28b interposed between first and second dielectric substrates 22 and 30. An earthing conductor 32 is accumulated or stacked on the reverse surface of second dielectric substrate 30, extending entirely along the reverse surface of second dielectric substrate 30.

Figure 3:
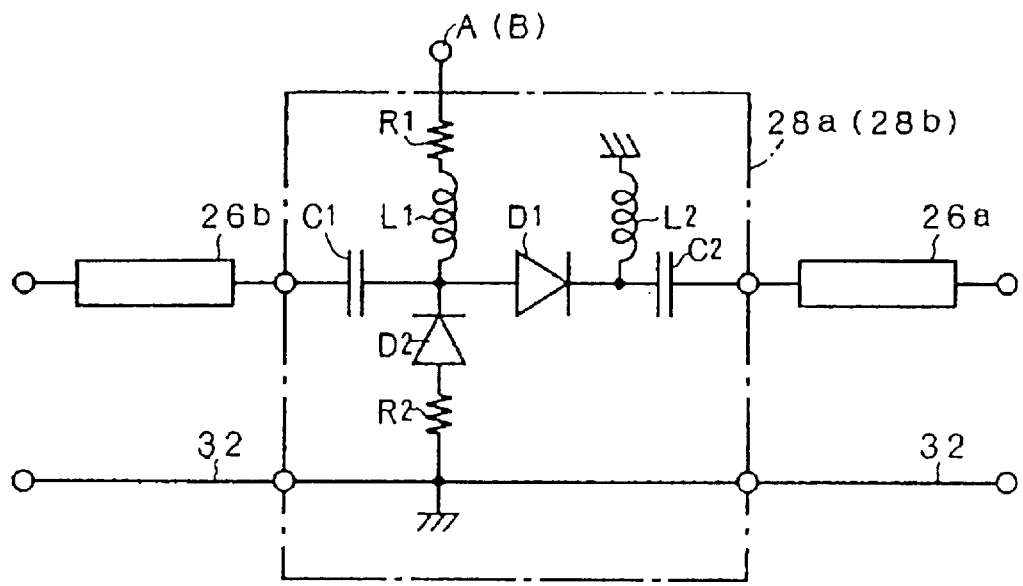
FIG. 3 is a circuit diagram showing the details of a high-frequency switch used in the first embodiment of the present invention.

The high-frequency switch 28a (or 28b), as shown in FIG. 3, comprises a first serial circuit consisting of a capacitor C1, a serial diode D1 and a capacitor C2 interposed in series between the branched parallel feeder 26b and the leftmost (or rightmost) serial feeder 26a, a second serial circuit consisting of a resistor R1 and a choke coil L1 which connects the anode of serial diode D1 and the switching terminal A (or B), and a third serial circuit consisting of a parallel diode D2 and a resistor R2 which connects the anode of serial diode D1 and the earthing conductor 32. A choke coil L2 is provided to connect the cathode of serial diode D1 to the earth.

Capacitors C1 and C2 are used to cut direct current exclusively and pass high-frequency signals, such as the receiving signal, effectively. Resistor R2 is a terminal resistance having a resistance value corresponding to the circuit impedance (e.g. 50Ω) of receiving antenna 10. Parallel diode D2 has an anode connected to the earthing conductor 32 via resistor R2 and a cathode connected to the anode of serial diode D1. Both of serial diode D1 and parallel diode D2 have high resistance values in a deactivated condition, and have low resistance values when current flows across them in the forward direction. In short, serial diode D1 and parallel diode D2 are variable-resistance diodes such as PIN diodes or the like.

According to the high-frequency switches 28a and 28b having the arrangement above described, when a positive voltage is applied to the switching terminal A (or B), current flows along the path connecting resistor R1, choke L1, serial diode D1 and choke coil L2 to the earth. The serial diode D1 is in the low-resistance condition in this case. On the contrary, no current flows through the parallel diode D2. Thus, the parallel diode D2 is in the high-resistance condition. As a result, when the positive voltage is applied to the switching terminal A (or B), the high-frequency switch 28a (or 28b) establishes a high-frequency conductive path connecting the parallel feeder 26b to the leftmost (or rightmost) serial feeder 26a (hereinafter this conductive condition is referred to as ON condition).

On the other hand, when a negative voltage is applied to the switching terminal A (or B), current flows along the path connecting resistor R1, choke L1, parallel diode D2 and resistor R2 to the earth. The parallel diode D2 is in the low-resistance condition in this case. On the contrary, no current flows through the serial diode D1. Thus, the serial diode D1 is in the high-resistance condition. As a result, when the negative voltage is applied to the switching terminal A (or B), the high-frequency switch 28a (or 28b) terminates or closes the feeder path by resistor R2 to disconnect the parallel feeder 26b and the leftmost (or rightmost) serial feeder 26a (hereinafter this terminated condition is referred to as OFF condition).

Then, as described previously, the switching signal SCO is directly supplied to the switching terminal A, while the switching signal SCO is inverted by the inverter 20a and supplied to the switching terminal B. Accordingly, when one of high-frequency switches 28a and 28b is in the ON condition, the other of high-frequency switches 28a and 28b is in the OFF condition. The ON-OFF condition of high-frequency switches 28a and 28b is alternately or cyclically changed in response to the positive or negative value of switching signal SCO.

More specifically, according to the receiving antenna 10 of the first embodiment, when the switching signal SCO of a positive voltage is generated from ECU 20, the high-frequency switch 28a is turned on and the other high-frequency switch 28b is turned off to form an array antenna in the left-end region corresponding to 8 lines and 7 rows of antenna elements 24 except the rightmost row of antenna elements 24. When the switching signal SCO of a negative voltage is generated from ECU 20, the high-frequency switch 28a is turned off and the other high-frequency switch 28b is turned on to form an array antenna in the right-end region corresponding to 8 lines and 7 rows of antenna elements 24 except the leftmost row of antenna elements 24.

According to the receiving antenna 10 of the first embodiment, by cyclically reversing the switching signal SCO between the positive and negative voltages, two array antennas are alternately formed in accordance with the inverting period of time, at the positions offset in the right-and-left (i.e. horizontal) direction by a distance equivalent to the width of one row of antenna elements 24.

Next, to act as a phase-comparison monopulse radar and an FM-CW radar, the details of the control operation executed in ECU 20 of the radar system of this embodiment will be explained.

First, ECU 20, using a predetermined voltage generating circuit (not shown), produces a control voltage increasing and decreasing along an ascending slope and a descending slope of the triangular waveform. The control voltage is supplied to voltage-controlled oscillator 2. The voltage-controlled oscillator 2 produces an FM modulation signal whose magnitude gradually increases and reduces according to the triangular waveform. Then, the transmitter antenna 6 transmits or emits the transmission radio wave in accordance with this FM modulation signal (transmission signal). If this transmission radio wave is reflected by any obstacle, the reflected radio wave is received by the receiving antenna 10.

Figure 4:
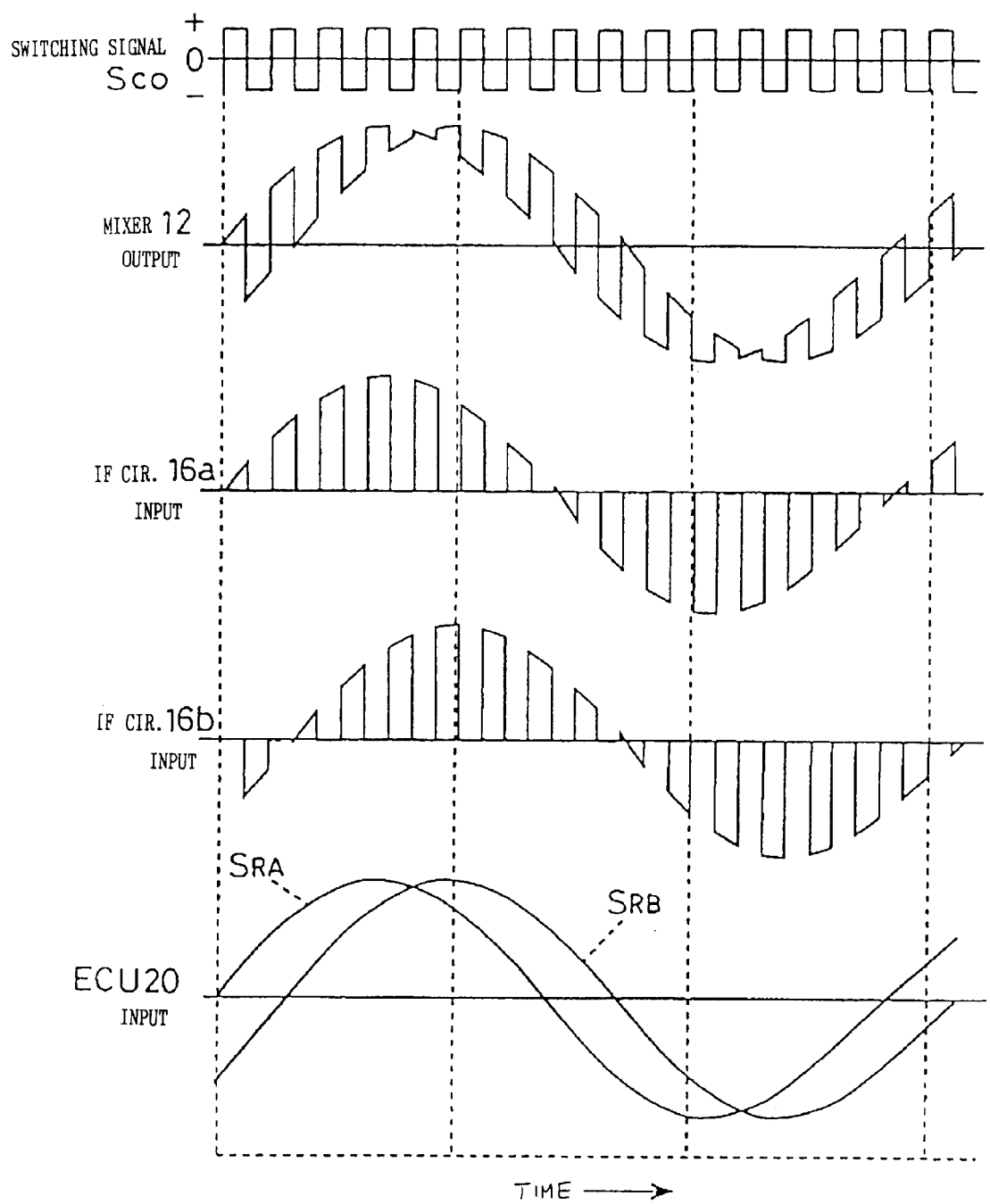
FIG. 4 is a time chart showing signal waveforms of various portions of the automotive radar system in accordance with the first embodiment of the present invention.

Furthermore, ECU 20, as shown in FIG. 4, using a switching signal generating circuit (not shown), produces the switching signal SCO alternating a positive voltage and a negative voltage at a predetermined period of time corresponding to a predetermined inverting frequency not smaller than two times the frequency of the transmission signal. In this embodiment, the inverting frequency is substantially 15 times as large as the frequency of the transmission signal. Accordingly, the receiving antenna is selectively switched between two offset array antennas in synchronism with the inverting period of time of the switching signal SCO. Thus, receiving antenna 10 produces in a time-division manner a receiving signal equivalent to the receiving signal obtained when the radio wave reflected from the target is alternately received by two independent (or non time-divisional type) receiving antennas.

The receiving signal is converted into an IF signal in the mixer circuit 12. Then, IF signal is entered into analog switch 14. Analog switch 14 is switched in accordance with switching signal SCO in synchronism with the switching operation of receiving antenna 10. As shown in FIG. 4, the IF signal (i.e. mixer output) entered into analog switch 14 is selectively supplied to IF circuit 16a or IF circuit 16b. More specifically, the left-end array antenna is formed when the high-frequency switch 28a is turned on. When the radio wave is received by this left-end array antenna, its IF signal is supplied to IF circuit 16a through analog switch 14. The right-end array antenna is formed when the high-frequency switch 28b is turned on. When the radio wave is received by this right-end array antenna, its IF signal is supplied to IF circuit 16b through analog switch 14.

In this manner, IF circuits 16a and 16b receive IF signals corresponding to two offset array antennas formed within the region of receiving antenna 10 in a time divisional fashion. The input waveform of IF circuit 16a (or 16b) varies intermittently in synchronism with the switching period of time of analog switch 14. IF circuit 16a (or 16b) not only functions as amplifying means for amplifying the IF signal but functions as integrating means for integrating the amplified IF signal. Thus, IF circuit 16a (or 16b) produces an output signal corresponding to the envelop of peak values of the entered intermittent IF signal. Thus, ECU 20 receives the output signals of both IF circuits 16a and 26b. These output signals are substantially the same as IF output signals obtained when the reflection radio wave is received by two independent (non time-divisional type) receiving antennas.

ECU 20 applies frequency analysis against either one of IF signals entered from IF circuits 16a and 16b according to the high-speed Fourier transformation method. Through this frequency analysis, ECU 20, as an FM-CW radar, calculates or measures the distance of the target reflected the transmission radio wave as well as the relative velocity of the target. Furthermore, ECU 20 compares the phases of a pair of receiving signals obtained from receiving antenna 10, based on respective IF signals. Through this phase comparison, ECU 20, as a phase-comparison monopulse radar, calculates or measures the direction (i.e. azimuth) of the target.

Based on the calculation or measurement result (i.e. distance, relative velocity and direction of the target), ECU 20 judges whether there is any possibility that the mobile body will collide with this target. When there is any possibility of collision, ECU 20 activates alarm device 18 to notify the driver of danger.

Alarm device 18, in response to the alarm information, generates alarm sound by a buzzer. A sound synthesizer will be used to generate a sound message notifying the direction, distance, relative velocity or the like of the target in accordance with the detection result.

As explained in the foregoing description, to realize the function of a phase-comparison monopulse radar, the radar system of the first embodiment comprises a planar array antenna capable of alternately forming two array antennas being offset by a distance equivalent to the width of one row of antenna elements 24 in a time divisional (or time sharing) manner by alternately switching the ON-and-OFF condition of high-frequency switches 28a and 28b. Using this planar array antenna makes it possible to obtain receiving signals equivalent to two kinds of receiving signals obtained from two independent (non time-divisional type) receiving antennas.

According to the first embodiment, when a phase-comparison monopulse radar system is installed on the mobile body, there is no necessity of using a pair of independent receiving antennas units, such as parabola antennas and waveguide horns. Only one compact receiving antenna 10, which is the above-described planar array antenna, is provided on the mobile body. Hence, the radar system is compact. Antenna 10 is easily installed on the mobile body. The planar array antenna does not require any reflection mirror or waveguide. Mass production and weight reduction of the radar system are easily realized. The radar system is cheap, and installable at any portion of the mobile body.

Furthermore, according to the receiving antenna 10, a pair of array antennas can be arranged for a phase-comparison monopulse radar system by switching the ON-and-OFF condition of high-frequency switches 28a and 28b. Two array antennas are offset in the horizontal direction by the distance equivalent to the width of one row of antenna elements 24. This offset value can be smaller than the diameter of the aperture of the antenna. Hence, the direction of the target (i.e. obstacle) can be univocally detected without decreasing the antenna gain and the maximum range.

Furthermore, to function as an FM-CW radar, the radar system of the first embodiment, detects the distance and the relative velocity of the target in addition to the direction of the target. This is advantageous to increase the accuracy in the collision judgement and to enhance the driving safety of the automotive vehicle.

In the first embodiment, ECU 20 increases or decreases the oscillation frequency of the voltage-controlled oscillator 2 by using the voltage generating circuit (not shown). In this respect, ECU 20 and the voltage-controlled oscillator 2 cooperatively work as transmission signal generating means of the present invention. Meanwhile, ECU 20 generates the switching signal SCO by the switching signal generating circuit (not shown). ECU 20, thus, acts as switching signal generating means of the present invention. Analog switch 14 distributes the IF signal to two IF circuits 16a and 16b in accordance with the switching signal SCO. Hence, analog switch 14 acts as distribution means of the present invention.

Mixer circuit 12 performs the frequency conversion (homodyne detection) of the receiving signal by using the transmission signal. ECU 20 calculates the direction, distance, and relative velocity of the target based on two IF signals produced from two IF circuits 16a and 16b. Accordingly, Mixer circuit 12 and ECU 20 cooperatively work as target detecting means of the present invention.

Second Embodiment

Figure 5A:
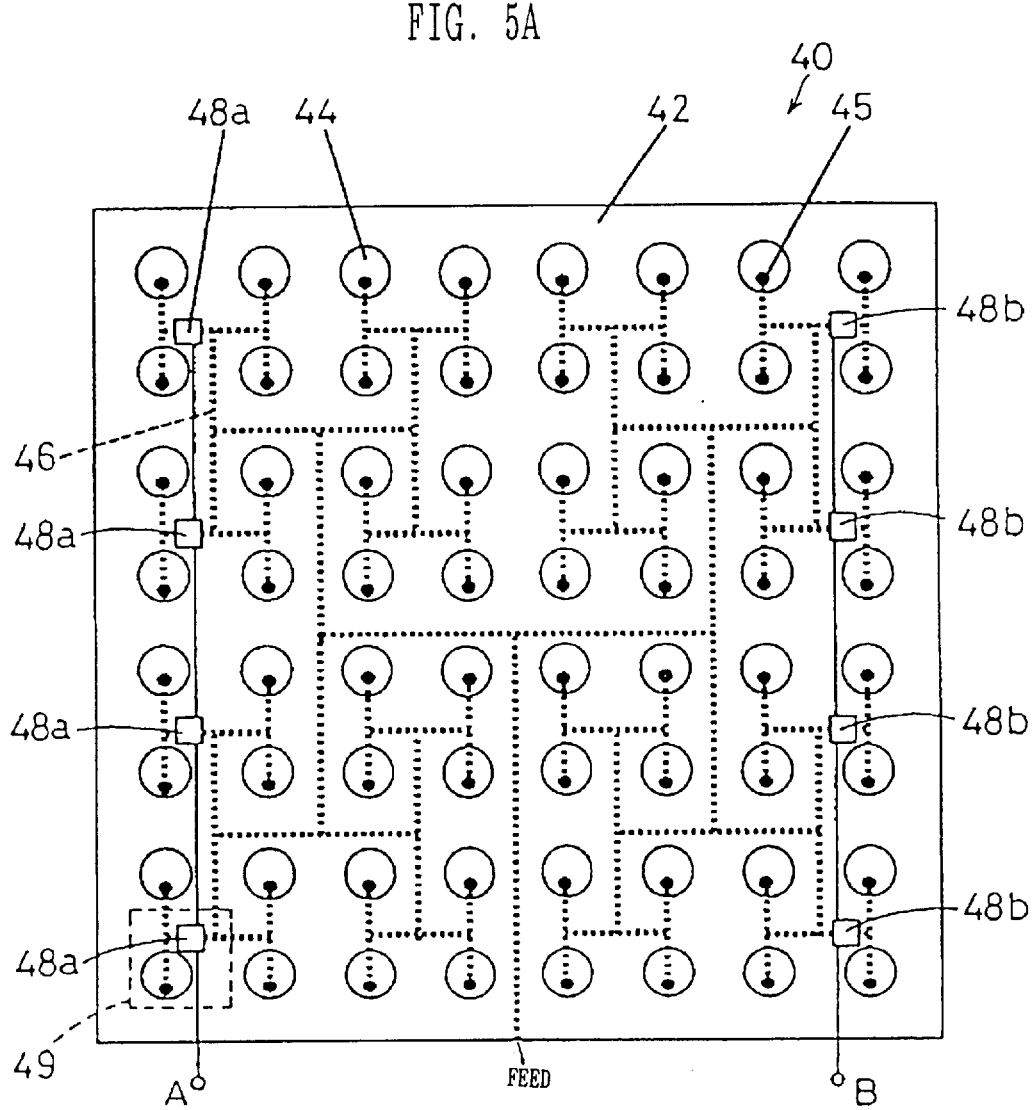
FIG. 5A is a front view showing an antenna surface of a receiving antenna used in an automotive radar system in accordance with a second embodiment of the present invention.
Figure 5B:
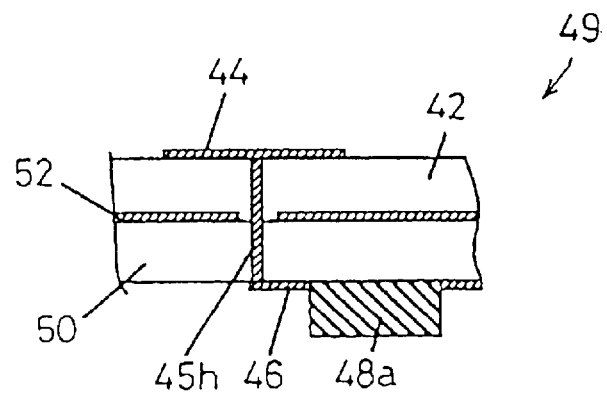
FIG. 5B is a cross-sectional view showing an antenna element section of the receiving antenna in accordance with the first embodiment of the present invention.

FIGS. 5A and 5B show an arrangement of another receiving antenna used for the automotive radar system in accordance with the present invention.

FIG. 5A shows a front surface of a receiving antenna 40 emitting radio wave therefrom. FIG. 5B is a cross-sectional view showing an antenna element region 49 comprising an antenna element 44 and a high-frequency switch 48a shown in FIG. 5A.

As shown in FIGS. 5A and 5B, receiving antenna 40 of the second embodiment comprises a first dielectric substrate 42 disposed at the front side thereof for emitting the radio wave and a second dielectric substrate 50 disposed at the reverse side thereof. A plurality of antenna elements 44 are disposed on the first dielectric substrate 42 in a predetermined matrix pattern. For example, eight antenna element 44 are arrayed along the vertical direction (i.e. in the direction of row) and eight antenna element 44 are arrayed along the horizontal direction (i.e. in the direction of line), thereby constituting a matrix pattern of 8 lines×8 rows.

Each antenna element 44 is constituted by a disk-shaped plane patch. These antenna elements 44 are equally spaced in both line and row directions. The interval of adjacent antenna elements 44 is determined in accordance with the frequency of the receiving signal to obtain optimum receiving characteristics.

Parallel feeder 46 is provided on the reverse surface of second dielectric substrate 50. Parallel feeder 46 extends from the feed, provided at the bottom of receiving antenna 40, to the center of the reverse surface of second dielectric substrate 50 then branches in the right and left directions until each branched parallel feeder 46 reaches the center of the right half region or the center of the left half region of the reverse surface of second dielectric substrate 50. Then, in each half region of the reverse surface, the parallel feeder 46 further branches in the up and down directions until each branched parallel feeder 46 reaches the center of the upper quarter region or the center of the lower quarter region of the reverse surface of second dielectric substrate 50. In this manner, the parallel feeder 46 branches successively (hierarchically) and symmetrically into 64 (=8×8) branched feeders so that the length of the parallel feeder 46 from the feed to each antenna element 44 is equalized for each antenna element 44.

A total of four high-frequency switches 48a are provided on the branched feeders 46 connected to a total of eight leftmost antenna elements 44 (i.e. leftmost row of the matrix of antenna elements 44). A total of four high-frequency switches 48b are provided on the branched feeders 46 connected to a total of eight rightmost antenna elements 44 (i.e. rightmost row of the matrix of antenna elements 44). Each of high-frequency switches 48a and 48b has substantially the same structure and function as the high-frequency switches 28a and 28b disclosed in the first embodiment (refer to FIG. 3). One high-frequency switch 48a (or 48b) is connected to two adjacent antenna elements 44 arrayed in the up-and-down direction (corresponding to two lines of the matrix of antenna elements 44). All of left high-frequency switches 48a simultaneously open or close their associated parallel pathways 46 in response to the switching signal SCO entered from a common terminal A. All of right high-frequency switches 48b simultaneously open or close their associated parallel pathways 46 in response to the inverted input of switching signal SCO entered from a common terminal B.

Each antenna element 44 has a feeder point 45 at the same portion. Under the flat bottom of each antenna element 44, a via-hole 45h extends from the reverse surface of second dielectric substrate 50 to the front surface of first dielectric substrate 42. With this via-hole 45h, parallel feeder 46 is connected to the feeder point 45 of each antenna element 44.

An earthing conductor 52 is accumulated or interposed between the reverse surface of first dielectric substrate 42 and the front surface of second dielectric substrate 50. Earthing conductor 52 constitutes a microstrip pathway between the antenna element 44 on the front surface of first dielectric substrate 42 and the parallel feeder 46 on the reverse surface of second dielectric substrate 50. Earthing conductor 52 has an opening at the region where each via-hole 45h extends perpendicularly so that the via-hole 45h serving as feeder to each antenna element 44 is electrically insulated from the earthing conductor 52.

According to the receiving antenna 40 of the second embodiment, by alternately turning on and off the high-frequency switches 48a and 48b, two array antennas are alternately formed in a time-divisional fashion at the positions offset in the right-and-left (horizontal) direction by a distance equivalent to the width of one row of antenna elements 44, in the same manner as receiving antenna 10 of the first embodiment. Accordingly, in the radar system shown in FIG. 2, the receiving antenna 10 can be replaced by receiving antenna 40 to detect the direction, distance and relative velocity of the target and generating an alarm to notify a driver of danger if there is any possibility of collisions.

According to the receiving antenna 40 of the second embodiment, the parallel feeder 46 is symmetrically arranged so that the length of the parallel feeder 46 is substantially identical for each antenna element 44. Thus, it becomes possible to realize a uniform and in-phase electric power supply to all of the antenna elements. Thus, even if the frequency of transmission radio wave varies depending on temperature, the phases of all the antenna elements 44 can be equalized. The receiving performance can be always stabilized. Hence, the accuracy in the detection of the target can be further improved.

Third Embodiment

An automotive radar system in accordance with a third embodiment of the present invention will be explained. The radar system of the third embodiment is characterized in that a single antenna 60 is used for transmitting and receiving radio waves.

An arrangement of the apparatus in accordance with the third embodiment will be explained with reference to FIGS. 6A and 6B. FIG. 6A shows a front surface of transmitting/receiving antenna 60 emitting radio wave therefrom. FIG. 6B is a cross-sectional view showing an intersecting region 29 shown in FIG. 6A where parallel feeders 26x and 26y mutually intersect. FIG. 6A is a partly broken view showing the details of the internal feeder arrangement of the transmitter/receiving antenna 60.

As shown in FIGS. 6A and 6B, the transmitting/receiving antenna 60 is substantially identical with the receiving antenna 10 of the first embodiment (shown in FIGS. 1A and 1B) except the arrangement of parallel feeders 26x and 26y supplying electric power to respective rows of antenna elements 24 disposed in a matrix pattern. The same components as those disclosed in the first embodiments are denoted by the same reference numerals and will not be explained hereinafter. Detailed arrangement of parallel feeders 26x and 26y will be explained hereinafter.

According to the transmitting/receiving antenna 60 of the third embodiment, the parallel feeder is divided into two parallel feeders 26x and 26y. One parallel feeder 26y (corresponding to a first feeder of the present invention) supplies electric power to a total of four rows of antenna elements 24 disposed at right- and left-end regions of the 8×8 matrix, i.e. the first and second rightmost rows of antenna elements 24 and the first and second leftmost rows of antenna elements 24. The other parallel feeder 26x (corresponding to a second feeder of the present invention) supplies electric power to another four rows of antenna elements 24 disposed at the central region of the 8×8 matrix.

The parallel feeder 26x, which branches hierarchically and symmetrically into four branched feeders, equalizes the length from the feed X to each of the central four rows of antenna elements 24, thereby realizing a uniform and in-phase distribution of electric power to the central four rows of antenna elements 24. In each row of antenna elements 24, electric power is successively transmitted to one antenna element 24 to another via serial feeders 26a by the electromagnetic coupling method.

The parallel feeder 26y supplies electric power from the same direction (i.e. from the bottom of FIG. 6A) as the parallel feeder 26x. The feed Y for the parallel feeder 26y is offset left from the feed X which is disposed at the horizontal center of the transmitting/receiving antenna 60. The parallel feeder 26y extends from the feed Y and branches in the right and left directions. Each branched feeder 26y further branches into two feeders connected to two rows of antenna pathways disposed the right- or left-end regions of the matrix.

Parallel feeders 26x and 26y are located between the reverse surface of first dielectric substrate 22 and the front surface of second dielectric substrate 30 except the region where the parallel feeders 26x and 26y mutually intersect. At the intersecting region, part of the parallel feeder 26y is shifted upward and located on the front surface of the first dielectric substrate 22. Both ends of this partly raised parallel feeder 26y are connected to the main part of the parallel feeder 26y through via-holes 26h.

In the parallel feeder 26y, the branched feeders extending in the right-and-left direction are differentiated in length. When $L_{Y1}$ and $L_{Y2}$ represent the lengths of left and right branched feeders, the difference between them is expressed by $L_{Y2}-L_{Y1}$. In this case, $L_{Y2}$ includes the length of via-holes 26h. To eliminate the influence of the pathway difference $L_{Y2}-L_{Y1}$, in each branched feeder, the electric angle corresponding to the pathway difference $L_{Y2}-L_{Y1}$ is equalized with the multiple of the wavelength of the transmitting/receiving radio wave.

According to the transmitting/receiving antenna 60 of the third embodiment, the parallel feeder 26x and its associated serial feeder 26a exclusively supply electric power to the centrally arrayed antenna elements 24 corresponding to the central four rows of the 8×8 matrix. The other parallel feeder 26y and its associated serial feeder 26a exclusively supply electric power to the outwardly arrayed remaining antenna elements 24 which correspond to the right and left four rows of the 8×8 matrix.

Power supply to the leftmost row of antenna element 24 is controlled by the high-frequency switch 28a, while power supply to the rightmost row of antenna element 24 is controlled by the high-frequency switch 28b, in the same manner as the first embodiment.

According to the above-described transmitting/receiving antenna 60 of the third embodiment of the present invention, the centrally arrayed antenna elements 24 corresponding to the central four rows of the 8×8 matrix are used for both of transmission and reception of radio waves. On the other hand, the outwardly arrayed remaining antenna elements 24 are used exclusively for receiving radio waves.

Figure 7:
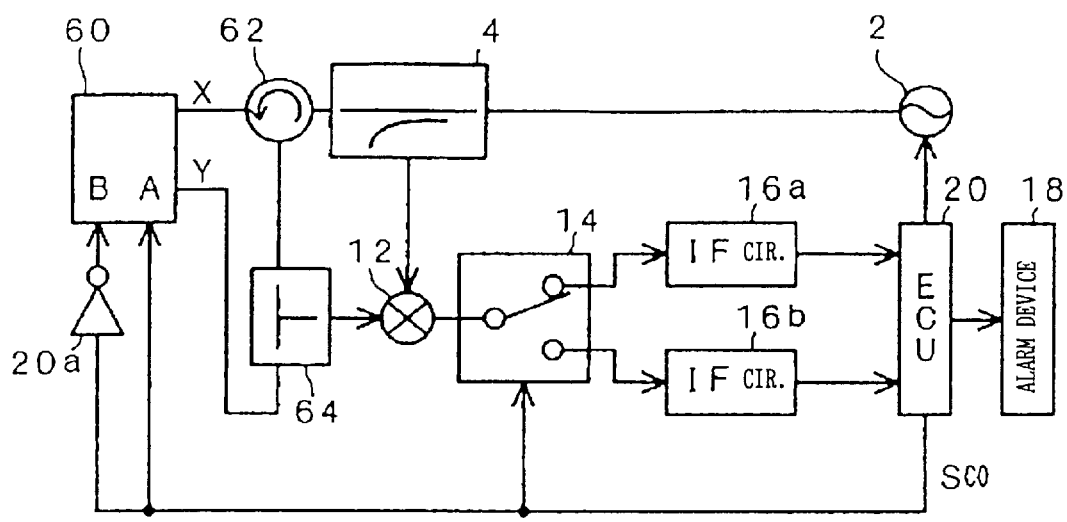
FIG. 7 is a block diagram showing an arrangement of the automotive radar system in accordance with the third embodiment of the present invention.

More specifically, as shown in FIG. 7, the radar system of the third embodiment comprises a circulator 62 connected to the feed X of transmitting/receiving antenna 60. The transmission signal is entered into the feed X through this circulator 62, and the receiving signal is taken out from the feed X through this circulator 62. Furthermore, the radar system of the third embodiment comprises a power combiner 64 which combines electric power of the receiving signal taken out from the circulator 62 and electric power of the receiving signal obtained from the feed Y, thus obtaining the sum of receiving signals received by all of antenna elements 24 of transmitting/receiving antenna 60. The power combiner 64 is arranged so as to realize an in-phase combining of the receiving signal obtained from the feed X and the receiving signal obtained from the feed Y.

Right and left high-frequency switches 28a and 28b of transmitting/receiving antenna 60 are turned on and off alternately in response to the switching signal SCO supplied from ECU 20, in the same manner as the right and left high-frequency switches 28a and 28b of receiving antenna 10 shown in FIG. 1A. By switching right and left high-frequency switches 28a and 28b alternately, the composite receiving signal is obtained from the power combiner 64. The receiving signal thus obtained through the transmitting/receiving antenna 60 is equivalent to the receiving signals alternately obtained from two independent (non time-divisional type) receiving antennas offset in a horizontal direction by a distance corresponding to one row of antenna elements 24.

The receiving signal is then entered into mixer circuit 12 and converted into an IF signal. IF signal is then entered into analog switch 14 which is switched in response to the switching signal SCO, and is separated into two IF signals corresponding to two time-divisional receiving antennas. The separated IF signals are amplified and integrated in the IF circuits 16a and 16b disposed in parallel. The outputs generated from respective IF circuits 16a and 16b are entered into ECU 20. ECU 20 calculates the direction, distance and relative velocity of the target based on the signals obtained from IF circuits 16a and 16b. When there is any possibility of collisions, ECU 20 causes alarm device 18 to generate a warning to the driver.

The radar system in accordance with the third embodiment is different from the radar system of the first embodiment shown in FIG. 2 in the transmitting/receiving antenna 60, circulator 62 and power combiner 64. Other arrangement of the third embodiment is identical with that of the first embodiment. Therefore, the same components are denoted by the same reference numerals in FIG. 7 and will not be explained again.

As explained above, the radar system of the third embodiment divides the parallel feeder 26b of the first embodiment into two independent parallel feeders 26x and 26y, to constitute the transmitting/receiving antenna 60 used for both transmitting and receiving radio waves. Thus, the distance and relative velocity of the target are detected using this single transmitting/receiving antenna 60.

According to the third embodiment, only one planar array antenna is provided for transmitting and receiving radio waves and, hence, there is no necessity of providing a transmitting antenna and a receiving antenna independently. Thus, the size and weight of the radar system can be reduced effectively.

Fourth Embodiment

Figure 8:
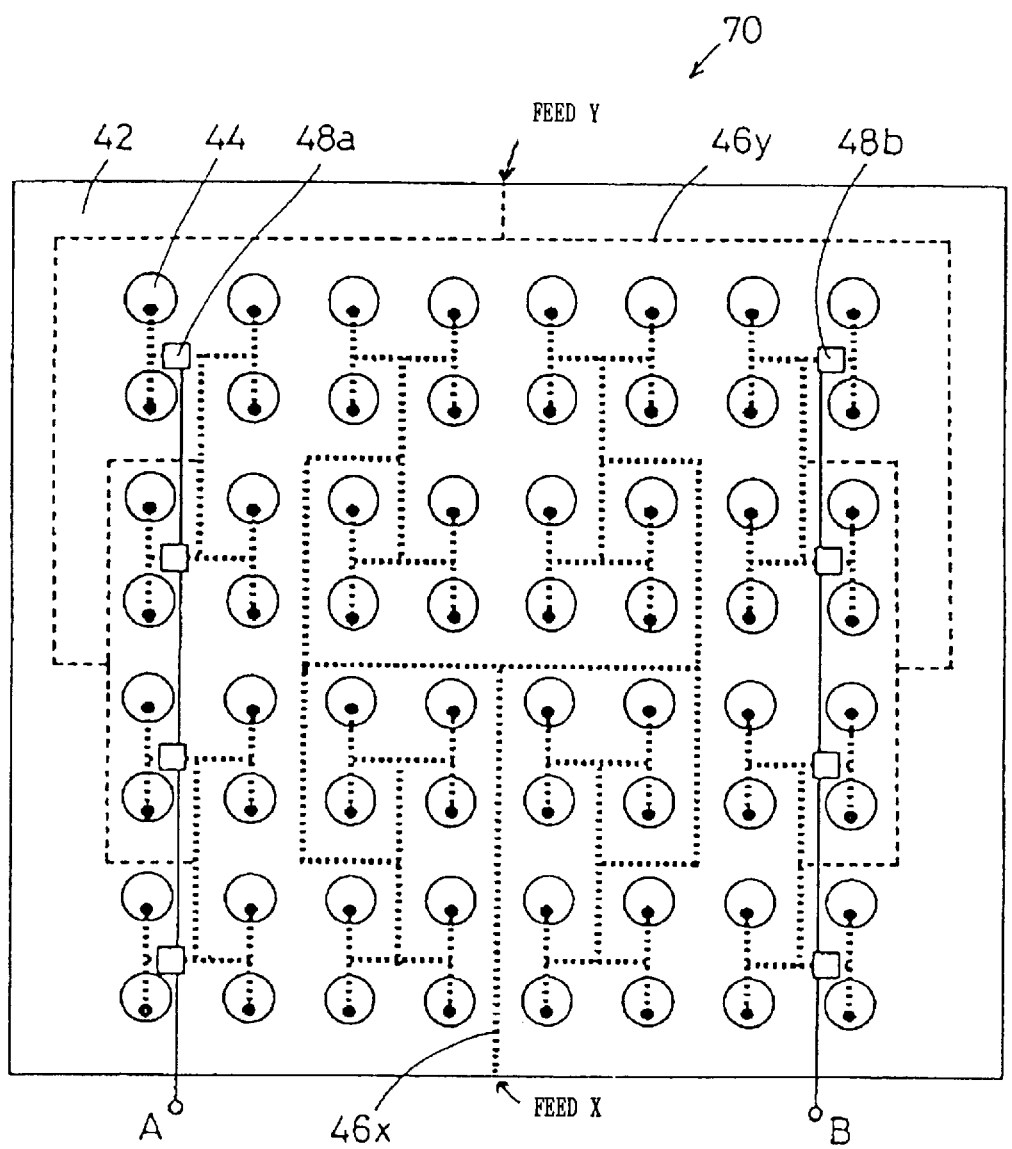
FIG. 8 is a front view showing an antenna surface of a transmitting/receiving antenna used in an automotive radar system in accordance with a fourth embodiment of the present invention.
Figure 9:
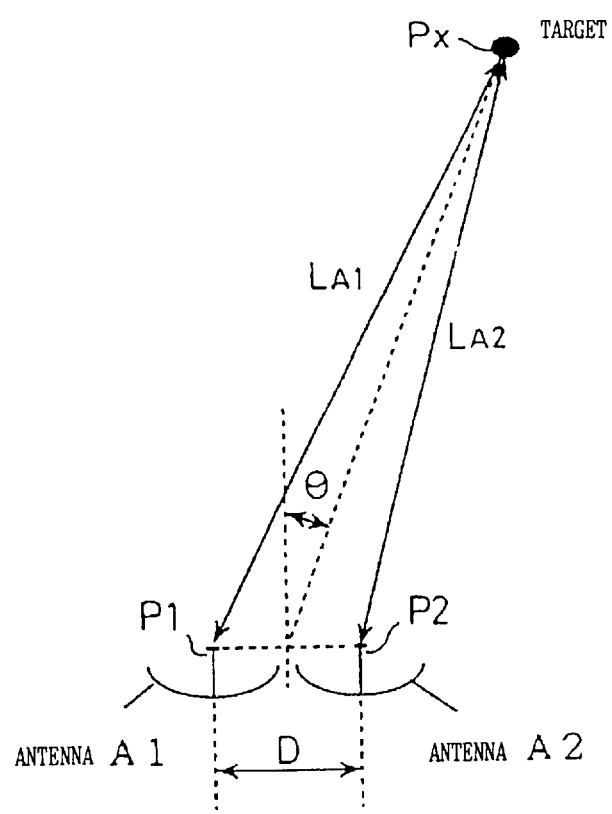
FIG. 9 is a view illustrating the principle in the detection of a target in a conventional phase-comparison monopulse radar system.
Figure 10A:
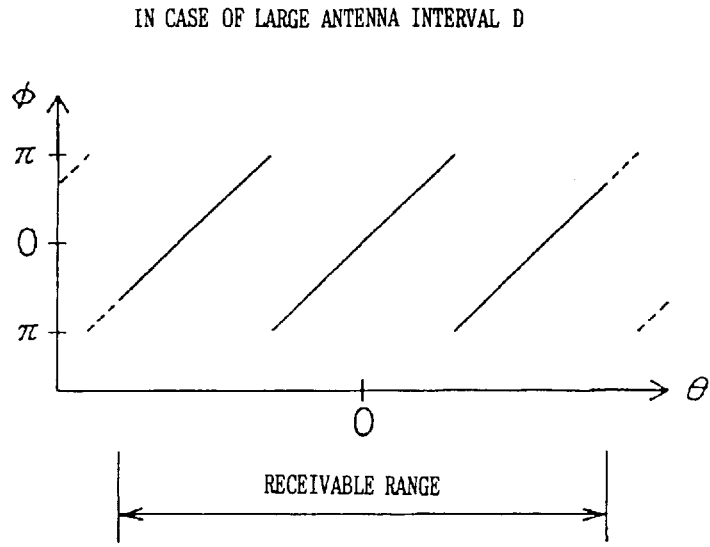
FIGS. 10A and 10B are graphs showing the receiving characteristics in relation to the antenna interval in the phase-comparison monopulse radar system.
Figure 10B:
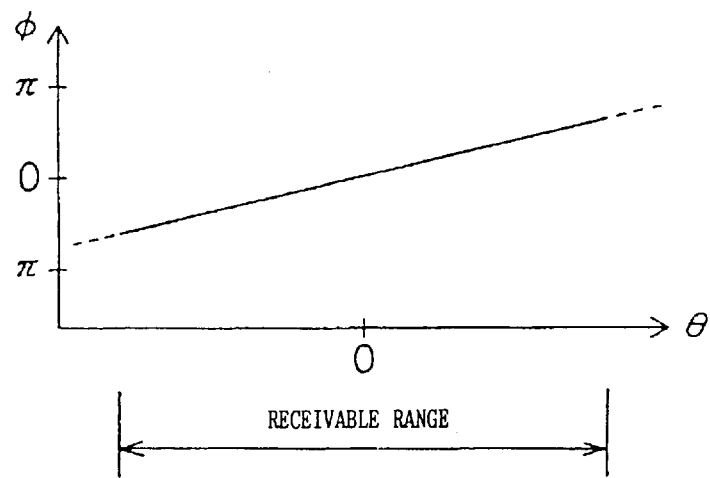

Next, another arrangement of a transmitting/receiving antenna applicable to the radar system of the third embodiment will be explained, with reference to FIG. 8. FIG. 8 shows a front surface of a transmitting/receiving antenna 70 emitting radio waves therefrom in accordance with the fourth embodiment of the present invention.

As apparent from FIG. 8, the transmitting/receiving antenna 70 of the fourth embodiment is basically identical with the receiving antenna 40 of the second embodiment shown in FIG. 5, except the arrangement of the parallel feeder supplying electric power to antenna elements 44.

According to the transmitting/receiving antenna 70 of the fourth embodiment of the present invention, the parallel feeder used for in-phase power feeding to antenna elements 44 is divided into two parallel feeders 46x and 46y. One parallel feeder 46y (corresponding to the first feeder of the present invention) supplies electric power to a total of four rows of antenna elements 44 disposed at right- and left-end regions of the 8×8 matrix, i.e. the first and second rightmost rows of antenna elements 44 and the first and second leftmost rows of antenna elements 44. The other parallel feeder 46x (corresponding to the second feeder of the present invention) supplies electric power to another four rows of antenna elements 44 disposed at the central region of the 8×8 matrix.

The parallel feeder 46x, which extends from the feed X positioned at the bottom of transmitting/receiving antenna 70 to the center of the antenna surface and branches successively (hierarchically) and symmetrically into 32 (=4×8) branched feeders, equalizes the length from the feed X to each antenna element 44 disposed in the central region corresponding to the central four rows of the 8×8 matrix, thereby realizing an in-phase distribution of electric power to the antenna elements 44. The other parallel feeder 46y, which branches from the feed Y to right- and left-end regions of the antenna surface. In each of right- and left-end regions, each branched parallel feeder 46y branches successively (hierarchically) and symmetrically into 16 (=2×8) branched feeders, so that the length from the feed Y to each antenna element 44 disposed in the end region corresponding to the right- and left-end four rows of the 8×8 matrix, thereby realizing an in-phase distribution of electric power to the antenna elements 44.

According to the parallel feeder arrangement of the transmitting/receiving antenna 70 of the fourth embodiment, the parallel feeder 46x exclusively supplies electric power to the centrally arrayed antenna elements 24 corresponding to the central four rows of the 8×8 matrix. The other parallel feeder 46y exclusively supplies electric power to the outwardly arrayed remaining antenna elements 24 which correspond to the right and left four rows of the 8×8 matrix.

Power supply to the antenna elements 44 of the leftmost row is controlled by the high-frequency switches 48a, while power supply to the antenna elements 44 of the rightmost row is controlled by the high-frequency switches 48b. High-frequency switches 48a and 48b are alternately turned on and off in response to the (positive or negative) input voltage applied to the switching terminals A and B in the same manner as in the second embodiment.

According to the transmitting/receiving antenna 70 of the fourth embodiment, by alternately turning on and off the high-frequency switches 48a and 48b, substantially two array antennas are alternately formed in a time-divisional fashion at the positions offset in the right-and-left direction by a distance equivalent to the width of one row of antenna elements 44, in the same manner as receiving antenna 40 of the second embodiment. Accordingly, in the radar system shown in FIG. 7, the transmitting/receiving antenna 60 can be replaced by receiving antenna 70 to detect the direction, distance and relative velocity of the target and generating an alarm to notify the driver of danger if there is any possibility of collisions.

According to the transmitting/receiving antenna 70 of the fourth embodiment, the parallel feeders 46x and 46y are symmetrically arranged from the feeds X and Y. Thus, it becomes possible to realize a uniform and in-phase electric power supply to all of the antenna elements 44. Thus, the direction of radiated beam during the transmission and reception of radio waves can be stabilized irrespective of change of temperature. The receiving performance can be always stabilized. Hence, the accuracy in the detection of the target can be further improved.

According to the parallel feeder arrangement of the fourth embodiment, two feeds X and Y are disposed at the bottom and the top of the antenna surface (i.e. dielectric substrate), respectively. In other words, two feeds X and Y are disposed at opposed ends of the antenna surface. This arrangement is advantageous to avoid interference between two parallel feeders, compared with the parallel feeder arrangement of the third embodiment (FIG. 6) where two feeds X and Y are disposed at the same end of the antenna surface.

Other Modifications

The planar array antennas, constituting receiving antennas 10 and 40 and transmitting/receiving antennas 60 and 70, have antenna elements disposed in the 8×8 matrix pattern. However, the number of lines or rows of the matrix can be arbitrarily changed in according to the antenna characteristics (frequencies of transmitting/receiving radio waves, width of radiated beam, antenna gain etc.). Furthermore, when the antenna elements are separated into two groups (i.e. the centrally arrayed group and the outwardly arrayed group), the number of rows belonging to each group can be arbitrarily changed in according to the antenna characteristics.

Furthermore, the number of rows open-and-close controlled by the high-frequency switches can be changed in the above-described planar array antennas, so that the offset distance of two time-divisional array antennas can be varied flexibly.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A planar array antenna comprising:

a plurality of antenna elements disposed in a predetermined matrix pattern;

feeder means comprising feeders for supplying electric power to said antenna elements;

switching means for opening or closing feeders of said feeder means connected to antenna elements constituting at least one row located at both a right end region and a left end region of said matrix pattern; and switching terminal means for supplying switching signals to said switching means for alternately activating said antenna elements disposed along the rows in the right end region and the left end region of said matrix pattern, thereby providing two array antennas which are offset in position by a distance corresponding to a width of said at least one row of the antenna elements controlled by said switching means and activated in a time-divisional fashion.

2. The planar array antenna in accordance with claim 1, wherein each of said antenna elements is formed by a plane patch.

3. The planar array antenna in accordance with claim 1, wherein said feeder means comprises serial feeders disposed along each row of said matrix pattern for supplying electric power to said plurality of antenna elements, and parallel feeders supplying electric power to said serial feeders.

4. The planar array antenna in accordance with claim 1, wherein said feeder means comprises parallel feeders directly supplying electric power to all of said plurality of antenna elements.

5. The planar array antenna in accordance with claim 1, wherein said feeder means comprises a first feeder comprising said feeders opened or closed by said switching means and supplying electric power to antenna elements disposed along rows in the right end and left end regions of said matrix pattern, and a second feeder supplying electric power to antenna elements disposed along rows in the central region of said matrix pattern.

6. A phase-comparison monopulse radar system comprising:

a planar array antenna exclusively used as a receiving antenna for receiving radio waves, said planar array antenna comprising a plurality of antenna elements disposed in a predetermined matrix pattern, feeder means comprising feeders for supplying electric power to said antenna elements, switching means for opening or closing feeders of said feeder means connected to antenna elements constituting at least one row located at both a right end region and a left end region of said matrix pattern, and switching terminal means for supplying switching signals to said switching means for alternately activating said antenna elements disposed along the rows in the right end region and the left end region of said matrix pattern, thereby providing two array antennas which are offset in position by a distance corresponding to a width of said at least one row of the antenna elements controlled by said switching means and activated in a time-divisional fashion;

switching signal generating means for generating said switching signals;

transmission signal generating means for generating a transmission signal and transmitting a transmission radio wave through a transmitting antenna;

distribution means for receiving reflection radio wave through said planar array antenna when said transmission radio wave is reflected from a target, and distributing a receiving signal obtained from said planar array antenna into two kinds of receiving signals in response to each switching signal produced from said switching signal generating means; and target detecting means for detecting a direction of said target based on a phase difference between said two kinds of receiving signals distributed by said distribution means.

7. The phase-comparison monopulse radar in accordance with claim 6, wherein said transmission signal generating means generates a predetermined continuous radio wave carrying said transmission signal, and said target detecting means detects said receiving signals by homodyne detection and calculates the direction, distance and relative velocity of said target based on said detection signal.

8. A phase-comparison monopulse radar system comprising:

planar array antenna used as a transmitting/receiving antenna for both transmitting and receiving radio waves, said planar array antenna comprising a plurality of antenna elements disposed in a predetermined matrix pattern, feeder means comprising feeders for supplying electric power to said antenna elements, switching means for opening or closing feeders of said feeder means connected to antenna elements constituting at least one row located at both a right end region and a left end region of said matrix pattern, and switching terminal means for supplying switching signals to said switching means for alternately activating said antenna elements disposed along the rows in the right end region and the left end region of said matrix pattern, thereby providing two array antennas which are offset in position by a distance corresponding to a width of said at least one row of the antenna elements controlled by said switching means and activated in a time-divisional fashion, wherein said feeder means comprises a first feeder comprising said feeders opened or closed by said switching means and supplying electric power to antenna elements disposed along rows in the right end and left end regions of said matrix pattern, and a second feeder supplying electric power to antenna elements disposed along rows in the central region of said matrix pattern;

switching signal generating means for generating said switching signals;

a circulator connected to a feed of said second feeder of said planar array antenna;

transmission signal generating means for generating a transmission signal, sending said transmission signal to the feed of said second feeder through said circulator, and transmitting a transmission radio wave from antenna elements disposed along the rows in the central region of said matrix pattern;

combining means for receiving reflection radio wave through said planar array antenna when said transmission radio wave is reflected from a target, receiving a first receiving signal obtained from the feed of said second feeder through said circulator, and combining said first receiving signal with a second receiving signal obtained from a feed of said first feeder;

distribution means for receiving a combined receiving signal produced from said combining means into two kinds of receiving signals in response to each switching signal produced from said switching signal generating means; and target detecting means for detecting a direction of said target based on a phase difference between said two kinds of receiving signals distributed by said distribution means.

9. The phase-comparison monopulse radar in accordance with claim 8, wherein said transmission signal generating means generates a predetermined continuous radio wave carrying said transmission signal, and said target detecting means detects said receiving signals by homodyne detection and calculates the direction, distance and relative velocity of said target based on said detection signal.

* * * * *